(12) United States Patent
Lin et al.

(10) Patent No.: US 10,595,122 B2
(45) Date of Patent: Mar. 17, 2020

(54) AUDIO PROCESSING DEVICE, AUDIO PROCESSING METHOD, AND COMPUTER PROGRAM PRODUCT

(71) Applicant: HTC Corporation, Taoyuan (TW)

(72) Inventors: Li-Yen Lin, Taoyuan (TW); Tsung-Yu Tsai, Taoyuan (TW); Yan-Min Kuo, Taoyuan (TW); Chun-Min Liao, Taoyuan (TW); Chi-Tang Ho, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/000,914

(22) Filed: Jun. 6, 2018

(65) Prior Publication Data

US 2018/0367893 A1 Dec. 20, 2018

Related U.S. Application Data

(60) Provisional application No. 62/519,876, filed on Jun. 15, 2017, provisional application No. 62/519,880, filed on Jun. 15, 2017.

(51) Int. Cl.
*H04R 1/40* (2006.01)
*H04S 7/00* (2006.01)
*H04S 3/00* (2006.01)
(Continued)

(52) U.S. Cl.
CPC ........... *H04R 1/403* (2013.01); *G02B 27/017* (2013.01); *H04R 3/12* (2013.01); *H04R 5/02* (2013.01);
(Continued)

(58) Field of Classification Search
CPC .......... H04R 1/403; H04R 3/12; H04R 3/008; H04R 5/02; H04R 5/04; H04R 2205/024;
(Continued)

(56) References Cited

U.S. PATENT DOCUMENTS 9,648,438 B1 * 5/2017 Petrov ..................... H04S 7/303
10,412,527 B1 * 9/2019 Miller ..................... H04S 7/301
(Continued)

OTHER PUBLICATIONS

PUI, Speaker power and distance, 2014.*
Oculus, How rift works with surround sound speakers, 2016.*

*Primary Examiner* — William A Jerez Lora
(74) *Attorney, Agent, or Firm* — JCIPRNET

(57) ABSTRACT

The disclosure provides an audio processing device, an audio processing method for controlling a plurality of speakers, and a computer program product. The audio processing device includes a memory, a transceiver, and a processor. The memory stores a plurality of modules. The transceiver is wirelessly paired with a plurality of speakers. The processor executes the modules to perform following steps: requesting each of the speakers to output an audio positioning signal; collecting the audio positioning signal from each of the speakers; retrieving a location of each of the speakers relative to the audio processing device according to the audio positioning signal from each of the speakers; adjusting a plurality of audio contents based on the location of each of the speakers relative to the audio processing device; and sending the audio contents to the speakers to control the speakers outputting the audio contents.

12 Claims, 5 Drawing Sheets

(51) Int. Cl.
  *G02B 27/01* (2006.01)
  *H04R 3/12* (2006.01)
  *H04R 5/02* (2006.01)
  *H04R 5/04* (2006.01)
(52) U.S. Cl.
  CPC ............... H04R 5/04 (2013.01); H04S 3/008 (2013.01); H04S 7/301 (2013.01); H04S 7/303 (2013.01); *H04R 2205/024* (2013.01); *H04R 2420/01* (2013.01); *H04R 2420/07* (2013.01)
(58) Field of Classification Search
  CPC ............ H04R 2420/01; H04R 2420/07; G02B 27/017; H04S 7/301; H04S 7/303
  USPC ................. 381/56, 58, 66, 300, 303
  See application file for complete search history.

(56) References Cited

U.S. PATENT DOCUMENTS

| | | | |
|---|---|---|---|
| 2011/0316967 A1* | 12/2011 | Etter | H04N 7/142 348/14.16 |
| 2015/0016642 A1* | 1/2015 | Walsh | H04S 7/301 381/307 |
| 2016/0125882 A1* | 5/2016 | Contolini | H04R 1/08 704/231 |
| 2017/0055097 A1* | 2/2017 | Dougherty | H04S 7/301 |
| 2017/0150255 A1* | 5/2017 | Wang | G04G 21/06 |
| 2017/0188171 A1* | 6/2017 | Ishida | G01S 15/42 |
| 2017/0289726 A1* | 10/2017 | Lee | H04S 3/008 |
| 2018/0095534 A1* | 4/2018 | Omote | G02B 27/022 |

\* cited by examiner

AUDIO PROCESSING DEVICE, AUDIO PROCESSING METHOD, AND COMPUTER PROGRAM PRODUCT

CROSS-REFERENCE TO RELATED APPLICATION

This application claims the priority benefits of U.S. provisional application Ser. No. 62/519,876, filed on Jun. 15, 2017, and U.S. provisional application Ser. No. 62/519,880, filed on Jun. 15, 2017. The entirety of each of the above-mentioned patent applications is hereby incorporated by reference herein and made a part of this specification.

BACKGROUND

Technical Field

The present invention generally relates to an audio processing device and an audio processing method, in particular, to an audio processing device and an audio processing method for controlling speakers to based their locations relative to the audio processing device, and a computer program product.

Description of Related Art

For virtual reality (VR) users, it is common to use headphones as the equipment for users to receive audio contents in the VR services for immersion effects. However, if the users want to use speakers as the equipment for receiving audio contents, the speakers having fixed locations may not adjust the outputted audio contents in response to the movement of the users in the virtual domain of the VR services, which may sabotage the VR experience.

For example, if a speaker is deployed right in front of a user wearing a head mounted display (HMD), the speaker will output the audio contents corresponding to the voice that comes from the front of the user in the virtual domain of the VR services. However, after the user has virtually moved, for example, forward for dozens of meters in the virtual domain, the audio contents outputted by the speaker will still be the same voice without being modified along with the movement of the user in the virtual domain. As a result, the audio experience of the user may be degraded for failing to provide the user with the actual environmental voice corresponding to the current location of the user in the virtual domain.

In addition, for achieving satisfying surround sound effects, the installation and settings of the speakers has to be arranged by professionals, such as the locations, gains, output power of the speakers. Therefore, as the speakers are used as the equipment for users to receive audio contents in the VR services, it is difficult for the users to determine the way of deploying the speakers in the environment (e.g., home).

Therefore, it is crucial for people having ordinary skills in the art to develop a mechanism that could adjust the audio contents outputted by the speakers when the speakers are used as the equipment for users to receive audio contents in the VR services.

SUMMARY

The disclosure provides an audio processing device. The audio processing device includes a memory, a transceiver, and a processor. The memory stores a plurality of modules. The transceiver is wirelessly paired with a plurality of speakers. The processor is coupled to the memory and the transceiver and executes the modules to perform following steps: requesting each of the speakers to output an audio positioning signal; collecting the audio positioning signal from each of the speakers; retrieving a location of each of the speakers relative to the audio processing device according to the audio positioning signal from each of the speakers; adjusting a plurality of audio contents based on the location of each of the speakers relative to the audio processing device; and sending the audio contents to the speakers to control the speakers outputting the audio contents.

The disclosure provides an audio processing method for controlling a plurality of speakers. The method includes: requesting, by an audio processing device, each of the speakers to output an audio positioning signal; collecting, by an audio processing device, the audio positioning signal from each of the speakers; retrieving, by an audio processing device, a location of each of the speakers relative to the audio processing device according to the audio positioning signal from each of the speakers; adjusting, by an audio processing device, a plurality of audio contents based on the location of each of the speakers relative to the audio processing device; and sending, by an audio processing device, the audio contents to the speakers to control the speakers outputting the audio contents.

The disclosure proposes a computer program product for use in conjunction with an audio processing device. The computer program product includes a computer readable storage medium and an executable computer program mechanism embedded therein, the executable computer program mechanism comprising instructions for: requesting each of a plurality of speakers paired with the audio processing device to output an audio positioning signal; collecting the audio positioning signal from each of the speakers; retrieving a location of each of the speakers relative to the audio processing device according to the audio positioning signal from each of the speakers; adjusting a plurality of audio contents based on the location of each of the speakers relative to the audio processing device; and sending the audio contents to the speakers to control the speakers outputting the audio contents.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
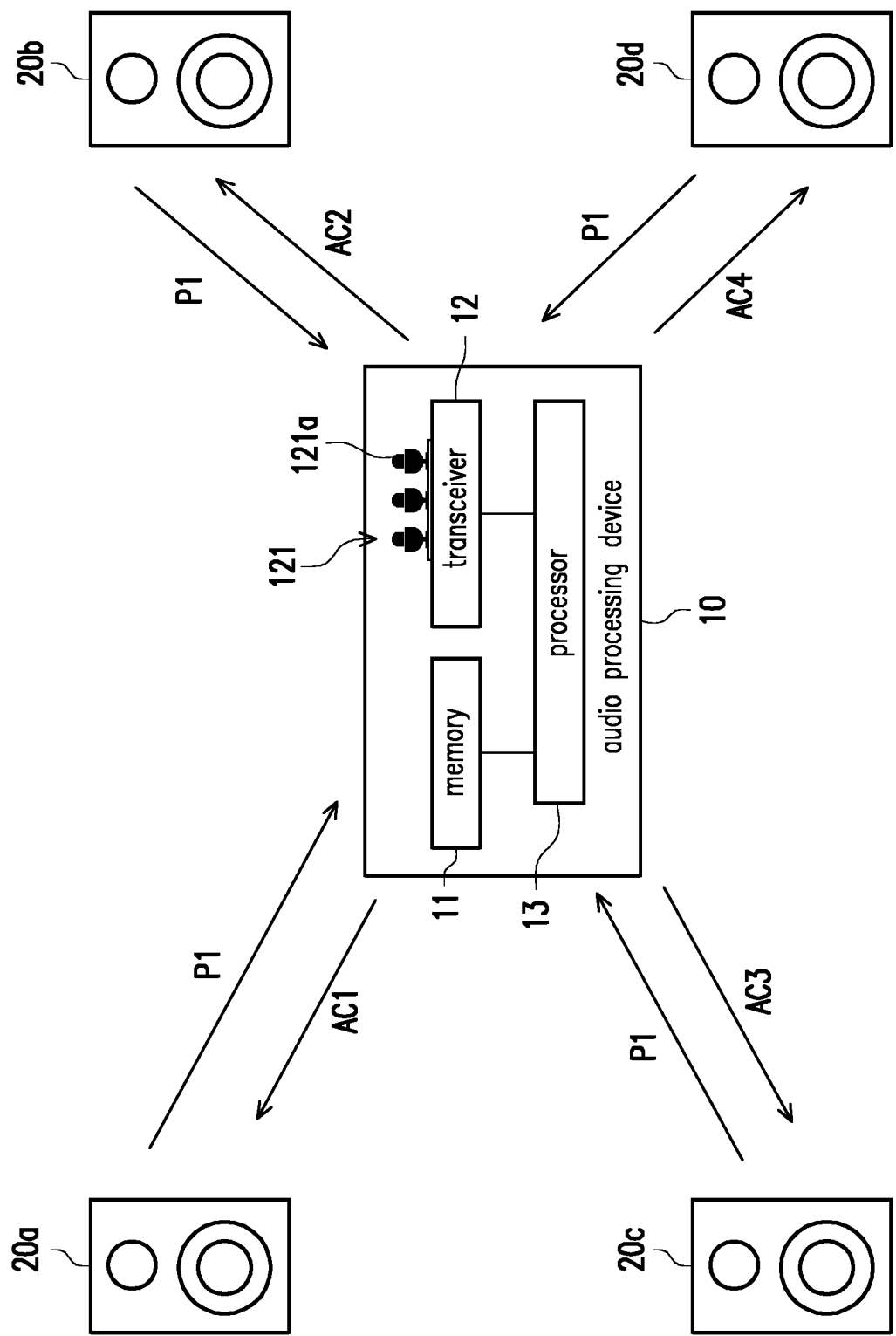
FIG. 1 is a schematic view of an audio system according to an exemplary embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "storage unit" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

See FIG. 1, which is a schematic view of an audio system according to an exemplary embodiment of the disclosure. In the present embodiment, the audio system 100 includes an audio processing device 10 and a plurality of speakers 20a, 20b, 20c, and 20d.

The audio processing device 10 includes a memory 11, a transceiver 12, and a processor 13. The memory 11 may be one or a combination of a stationary or mobile random access memory (RAM), read-only memory (ROM), flash memory, hard disk, or any other similar device, and which records a plurality of programs or modules that can be executed by the processor 13.

The transceiver 12 may include a transmitter circuit, an A/D (analog-to-digital) converter, a D/A converter, a low noise amplifier, a mixer, a filter, an impedance matcher, a transmission line, a power amplifier, one or more antenna circuits and a local storage medium element (but the disclosure is not limited thereto), such that the audio processing device 10 can provide wireless transmitting/receiving functions to the speakers 20a-20d. In one embodiments of the disclosure, the speakers 20a-20d may be Bluetooth speakers, and the audio processing device 10 may be wirelessly paired with the speakers 20a-20d via the transceiver 12 based on Bluetooth communication protocol. In other embodiments, the audio processing device 10 may be paired with the speakers 20a-20d based other preferred communication protocols.

In the embodiments of the disclosure, the transceiver 12 may include a microphone array 121 formed by a plurality of microphones 121a for collecting the audio signals from the speakers 20a-20d.

The processor 13 is coupled to the memory 11 and the transceiver 12, and may be a processor for general purposes, a processor for special purposes, a conventional processor, a digital signal processor, a plurality of microprocessors, one or more microprocessors, controllers and microcontrollers which are combined with a core of the digital signal processor, an application specific integrated circuit (ASIC), a field programmable gate array (FPGA), any other integrated circuits, a state machine, a processor based on advanced RISC machine (ARM) and the like.

In the present embodiment, the processor 13 can access and execute the program codes stored in the memory 11 in order to perform each step in the audio processing method for controlling speakers proposed in the present disclosure.

Figure 2:
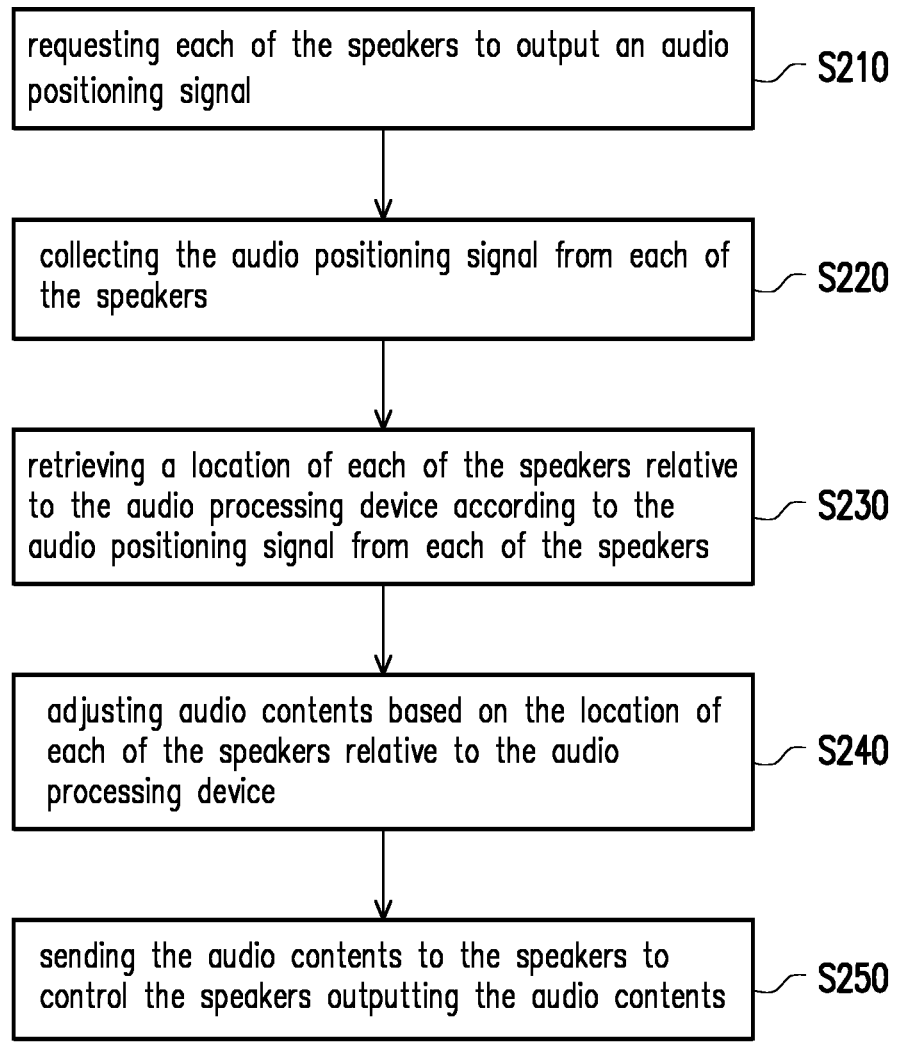
FIG. 2 is a flow chart of the audio processing method for controlling speakers according to an exemplary embodiment of the disclosure.

See FIG. 2, which is a flow chart of the audio processing method for controlling speakers according to an exemplary embodiment of the disclosure. The method of FIG. 2 could be performed by the audio processing device 10 FIG. 1, and the details of the steps of FIG. 2 will be discussed in accompanying with the elements of FIG. 1.

In step S210, the processor 13 requests each of the speakers 20a-20d to output an audio positioning signal P1. In step S220, the processor 13 collects the audio positioning signal P1 from each of the speakers 20a-20d. In step S230, the processor 13 retrieves a location of each of the speakers 20a-20d relative to the audio processing device 10 according to the audio positioning signal P1 from each of the speakers 20a-20d. In the present embodiment, the audio positioning signal P1 may be a specific audio signal that is known by the audio processing device 10, such that the processor 13 may obtain the locations of the speakers 20a-20d via analyzing the characteristics of the audio positioning signal P1 after receiving the audio positioning signal P1 from the speakers 20a-20d.

Specifically, in one embodiment, the processor 13 may request the speaker 20a to output the audio positioning signal P1 with a predetermined power. Next, the transceiver 12 may collect the audio positioning signal P1 by adjusting a receiving polar pattern of the microphone array 121 to find a specific direction where a received power of the audio positioning signal P1 is maximized. As exemplarily shown in FIG. 1, since the speaker 20a approximately locates on the left front of the audio processing device 10, the processor 13 may determine that the received power of the audio positioning signal P1 is maximized after the receiving polar pattern of the microphone array 121 is adjusted to be pointing to the left-front direction. That is, the processor 13 may know that the speaker 20a locates on the left front of the audio processing device 10.

Afterwards, the processor 13 may determine a specific distance between the audio processing device 10 and the speaker 20a based on the predetermined power and the received power. Specifically, since the processor 13 knows the powers of the audio positioning signal P1 being outputted and received, the processor 13 may accordingly derive the distance between the speaker 20a and the audio processing device 10 based on the ratio between the predetermined power and the received power. More particularly, since the received power can be regarded as an attenuated version of the predetermined power after the audio positioning signal P1 has experienced the spatial propagation between the speaker 20a and the audio processing device 10, the specific distance between the speaker 20a and the audio processing device 10 may be calculated based on known acoustic attenuation laws, but the disclosure is not limited thereto.

Thereafter, the processor 13 may determine that the location of the speaker 20a relative to the audio processing device 10 to be on the left front of the audio processing device 10 and away from the audio processing device 10 by the specific distance.

Similarly, the processor 13 may retrieve the locations of the speakers 20b-20d based on the above teachings, which will not be repeated herein.

In step S240, the processor 13 adjusts audio contents based on the location of each of the speakers 20a-20d relative to the audio processing device 10. In step S250, the processor 13 sends the audio contents to the speakers 20a-20d to control the speakers 20a-20d outputting the audio contents.

In the present embodiment, the processor 13 may process the audio contents based on a plurality of space transfer functions, wherein the space transfer functions are defined based on the location of each of the speakers 20a-20d relative to the audio processing device 10 and allocate the audio contents to the speakers 20a-20d. In one embodiment, after the locations of the speaker 20a-20d have been known by the processor 13, the processor 13 may use the space transfer functions to modify the features (e.g., loudness, direction, etc.) of the audio contents (which may be the audio part of the VR content provided to the user) to make the audio contents provide an acceptable surround sound effect as being collaboratively outputted by the speakers 20a-20d.

In one embodiment, it is assumed that there are four audio channels in the audio contents and each of the audio channels provides voice from different directions. Since the location of the speaker 20a is known to be on the left front of the audio processing device 10 by the specific distance, the processor 13 may pick the audio channel providing voices (e.g., VR sounds) approximately coming from the left front, modify the features (e.g., loudness) of the corresponding audio content based on the distance between the speaker 20*a* and the audio processing device 10, and allocate the modified audio content (hereinafter, an audio content AC1) to the speaker 20*a*. As a result, when the audio content AC1 is sent to the speaker 20*a* and outputted by the speaker 20*a*, the speaker 20*a* could be felt like automatically outputting the voices approximately coming from the left front.

Similarly, since the location of the speaker 20*b* is known to be on the right front of the audio processing device 10 by another distance, the processor 13 may pick the audio channel providing voices (e.g., VR sounds) approximately coming from the right front, modify the features (e.g., loudness) of the corresponding audio content based on the distance between the speaker 20*b* and the audio processing device 10, and allocate the modified audio content (hereinafter, an audio content AC2) to the speaker 20*b*. As a result, when the audio content AC2 is sent to the speaker 20*b* and outputted by the speaker 20*b*, the speaker 20*b* could be felt like automatically outputting the voices approximately coming from the right front.

Based on the above teachings, the audio contents corresponding to the audio channels providing voices (e.g., VR sounds) approximately coming from the left rear and right rear can be modified based on the locations of the speakers 20*c* and 20*d* and allocated to the speakers 20*c* and 20*d*, respectively. As a result, when the modified audio contents (hereinafter, audio contents AC3 and AC4) sent to the speakers 20*c* and 20*d* and outputted by the speakers 20*c* and 20*d*, respectively, the speakers 20*c* and 20*d* could be felt like automatically outputting the voices approximately coming from the left rear and right rear.

Consequently, when the speakers 20*a*-20*d* simultaneously outputted the corresponding audio contents, an acceptable surround sound effect can be still achieved, even though the installation and settings of the speakers 20*a*-20*d* are not arranged by professionals.

As can be known from the above, the method of the disclosure provides a mechanism that can automatically adjust the audio contents to be outputted by speakers based on the locations of the speakers relative to the audio processing device, which reduces the difficulty of constructing an environment with surround sound, such as a home cinema.

In other embodiments, the disclosure further provides a mechanism that could additionally adjust the audio contents to be outputted by the speakers based on the movement of the user in the virtual domain of VR services.

Figure 3:
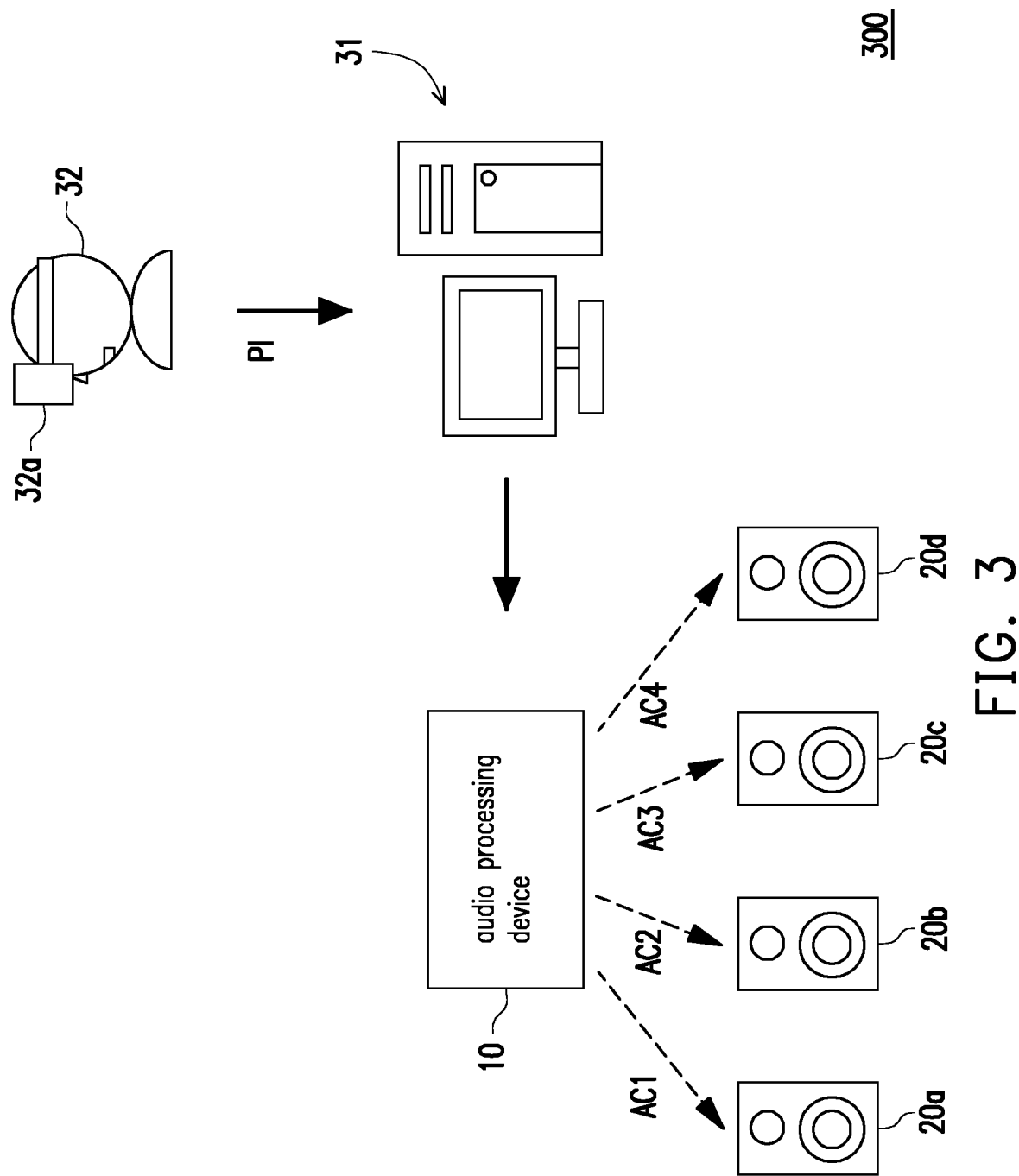
FIG. 3 is a schematic view of a VR system according to an exemplary embodiment of the disclosure.

See FIG. 3, which is a schematic view of a VR system according to an exemplary embodiment of the disclosure. In the present embodiment, the VR system 300 includes the audio processing device 10, the speakers 20*a*-20*d*, a computing device 31, and an HMD 32*a*. In other embodiments, the VR system 300 may further include VR controllers to be held by hands of the user 32 for controlling the VR contents. In FIG. 3, the audio processing device 10 and the HMD 32*a* may be connected to the computing device 31 mainly managing and controlling the VR services provided to the user 32 wearing the HMD 32*a*.

In the present embodiment, the HMD 32*a* and the VR controllers may detect the movement of the user 32 in the real domain and/or the virtual domain and accordingly generate position information PI. The position information PI may be received by the computing device 31 (e.g., a personal computer or some other devices that can run the VR services) and forwarded to the audio processing device 10 by the computing device 31.

The audio processing device 10 may receive the position information PI via the transceiver 12. Afterwards, the processor 13 may process the audio contents based on the space transfer functions and the position information PI and allocate the audio contents to the speakers 20*a*-20*d*, and the related details will be discussed along with FIG. 4.

Figure 4:
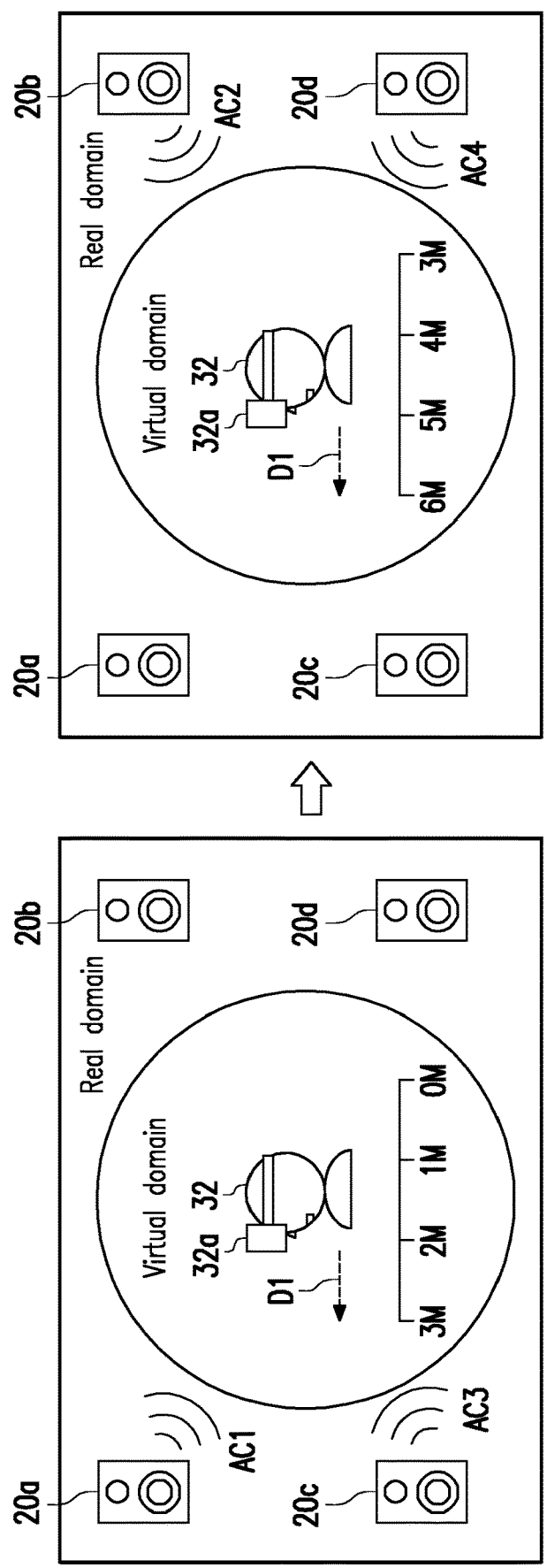
FIG. 4 is a schematic view showing the scenario of adjusting audio contents outputted by the speakers according to an embodiment of the disclosure.

See FIG. 4, which is a schematic view showing the scenario of adjusting audio contents outputted by the speakers according to an embodiment of the disclosure. In FIG. 4, the locations of the speakers 20*a*-20*d* may be obtained by the audio processing device 10 according to the teachings in the previous embodiments, which will not be repeated herein.

In the present embodiment, the user 32 may be assumed to face a direction D1, and the speakers 20*a* and 20*c* are assumed to output the audio contents AC1 and AC3. Since the user 32 is facing the direction D1 and the speaker 20*a* locates on the right front of the user 32, the audio content AC1 outputted by the speaker 20*a* should correspond to the voices coming from the right front in the virtual domain. Similarly, since the speaker 20*c* locates on the left front of the user 32, the audio content AC3 outputted by the speaker 20*c* should correspond to the voices coming from the left front in the virtual domain.

As the user 32 moves along the direction D1 for several meters in the real domain, the character played by the user 32 in the virtual domain of the VR services may correspondingly move along the direction D1 for dozens of meters. During the user 32 moving along the direction D1, the position information PI may be continuously updated and forwarded to the audio processing device 10, and the audio processing device 10 may correspondingly adjust the audio contents AC1 and AC3.

Specifically, since the audio contents AC1 and AC3 respectively comes from some specific sound sources in the virtual domain of the VR services, as the user 32 moves along the direction D1, it represents the character played by the user 32 is getting closer and closer to the specific sound sources in the virtual domain. Therefore, the processor 13 may use the space transfer functions to process the audio contents AC1 and AC3 by, for example, continuously increasing the loudness of the audio contents AC1 and AC3, such that the user 32 may feel like getting closer and closer to the specific sound sources. In other examples, since the user 32 may use the VR controllers to control the character to virtually move along the direction D1 instead of actually moving in the real domain, the processor 13 may still use the space transfer functions to process the audio contents AC1 and AC3 by, for example, continuously increasing the loudness of the audio contents AC1 and AC3, such that the user 32 may feel like getting closer and closer to the specific sound sources, but the disclosure is not limited thereto.

In addition, as the user 32 keeps (virtually) moving along the direction D1 and passes the specific sound sources, the processor 13 may use the space transfer functions to process the audio contents AC1 and AC3 by, for example, muting the audio contents AC1 and AC3, if there are no sound sources other than the specific sound sources in the virtual domain. Meanwhile, since the specific sound sources should be behind the character played by the user 32 in the virtual domain, the processor 13 may use the space transfer functions to process the audio contents AC1 and AC3, such that the speakers 20*b* and 20*d* currently behind the user 32 may sound like outputting the sounds from the specific sound sources when outputting the audio contents AC2 and AC4.

As the user 32 keeps (virtually) moving along the direction D1, it represents the character played by the user 32 is getting away from the specific sound sources in the virtual domain. Therefore, the processor 13 may use the space transfer functions to process the audio contents AC2 and AC4 by, for example, continuously decreasing the loudness of the audio contents AC2 and AC4, such that the user 32 may feel like getting further and further away from the specific sound sources.

In other examples, it is assumed that the user 32 directly faces the speaker 20a while the speaker 20a outputting the audio content AC1 currently corresponding to the sounds coming from the front of the character in the virtual domain. In this case, when the user 32 (virtually) turns his/her head to the right, the updated position information PI may be forwarded to the audio processing device 10. In response thereto, the processor 13 may use the space transfer functions to change the audio content AC1 to correspond to the sounds coming from the left of the character in the virtual domain.

As can be known from the above, the method of the disclosure may further take the position information of the user in the virtual domain into consideration and accordingly adjust the audio contents to be outputted by speakers. Therefore, the user may still have the immersive VR experiences when the speakers are adopted as the equipment to receive audio contents in the VR services.

In some embodiments, the audio processing device 10 may be further paired with a plurality of smart phones and use the microphones on these smart phones to construct a microphone array for collecting the audio positioning signal P1 from the speakers 20a-20d, such that the audio positioning signal P1 can be better collected.

Specifically, as shown in FIG. 1, the microphone array 121 is usually used to collect voices from some specific directions or to suppress voices from some specific directions. Since the audio signals collected by the microphone array 121 need to be processed by some algorithms highly related to the voice collecting equipment on the front end (e.g., the microphone 121a), the algorithms and the microphone array 121 are usually integrated as a module for sale. However, due to the size limitation of the module, the microphones 121a in the microphone 121 array are too close to each other, which degrades the performance of collecting audio signals. In addition, the direction of the microphone array 121 collecting and suppressing audio signals are less adjustable as well.

Accordingly, the disclosure proposes to use smart phones to construct a microphone array for overcoming the above issues. See FIG. 5 for further discussions.

Figure 5:
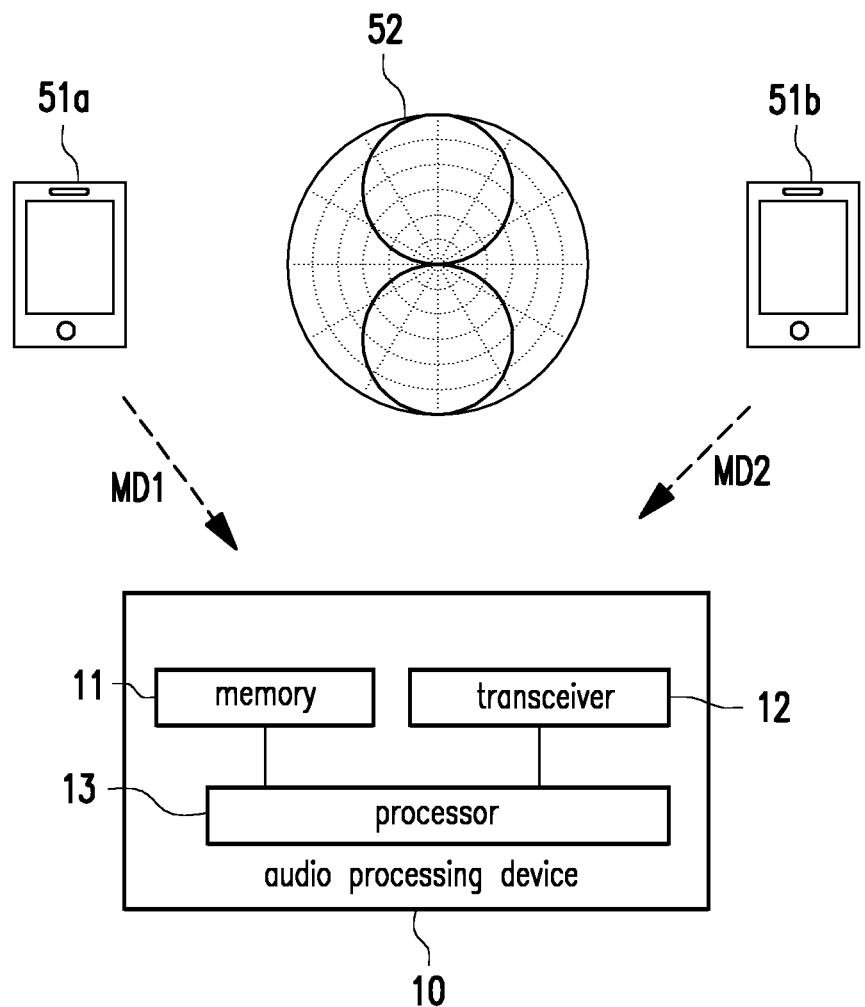
FIG. 5 is a schematic view of using smart phones to construct a microphone array according to an embodiment of the disclosure.

FIG. 5 is a schematic view of using smart phones to construct a microphone array according to an embodiment of the disclosure. In FIG. 5, smart phones 51a and 51b can be paired with the audio processing device 10, and the microphones on the smart phones 51a and 51b may be used to collaboratively collect audio signals (e.g., the audio positioning signal P1 in FIG. 1) and accordingly generate microphone data MD1 and MD2. The microphone data MD1 and MD2 can be forwarded to the audio processing device 10, and the processor 13 may adopt known algorithms to process the microphone data MD1 and MD2 to, for example, collect voices from some specific directions or to suppress voices from some specific directions.

In addition, the relative positions of the smart phones 51a and 51b can be adjusted to calibrating the polar pattern 52 for collecting audio signals. That is, the performance of collecting audio signals is less limited by size.

As can be known from the above, after the smart phones 51a and 51b are used to collect audio signals for the audio processing device 10, the performance and flexibility of collecting audio signals can be improved.

To sum up, the method of the disclosure provides a mechanism that can automatically adjust the audio contents to be outputted by speakers based on the locations of the speakers relative to the audio processing device, which reduces the difficulty of constructing an environment with surround sound, such as a home cinema. In addition, the disclosure further provides a mechanism that could additionally adjust the audio contents to be outputted by the speakers based on the movement of the user in the virtual domain of VR services, which makes the user may still have the immersive VR experiences when the speakers are adopted as the equipment to receive audio contents in the VR services.

Moreover, the audio processing device of the disclosure may be further use the microphones on the smart phones to construct a microphone array for collecting the audio signal, such that the performance and flexibility of collecting audio signals can be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An audio processing device, comprising:
a non-transitory memory, storing a plurality of modules;
a transceiver, wirelessly paired with a plurality of speakers;
a processor, coupled to the non-transitory memory and the transceiver and executing the modules to perform following steps:
requesting each of the speakers to output an audio positioning signal;
collecting the audio positioning signal from each of the speakers;
retrieving a location of each of the speakers relative to the audio processing device according to the audio positioning signal from each of the speakers;
adjusting a plurality of audio contents based on the location of each of the speakers relative to the audio processing device, wherein the transceiver is further configured to receive position information from a computing device, the position information is generated by the computing device based on a movement of a user in a virtual domain of a virtual reality service, and the processor is configured to: process the audio contents based on a plurality of space transfer functions and the position information, wherein the space transfer functions are defined based on the location of each of the speakers relative to the audio processing device; allocate the audio contents to the speakers; and
sending the audio contents to the speakers to control the speakers outputting the audio contents.

2. The audio processing device of claim 1, wherein the transceiver comprises a microphone array for receiving the audio positioning signal from each of the speakers, and the processor is configured to:
requesting a first speaker of the speakers to output the audio positioning signal with a predetermined power;

adjusting a receiving polar pattern of the microphone array to find a specific direction where a received power of the audio positioning signal is maximized;

determining a specific distance between the audio processing device and the first speaker based on the predetermined power and the received power; and determining the location of the first speaker relative to the audio processing device to be away from the audio processing device by the specific distance on the specific direction.

3. The audio processing device of claim 2, wherein the microphone array is formed by a plurality of microphones on different smart phones.

4. The audio processing device of claim 1, wherein a first audio content of the audio contents is allocated to a first speaker of the speakers, and the processor is configured to send the first audio content to the first speaker and control the first speaker to output the first audio content.

5. The audio processing device of claim 1, wherein the transceiver is further configured to receive updated position information from the computing device, and the processor is configured to:

process the audio contents based on the space transfer functions and the updated position information; and allocate the audio contents to the speakers.

6. The audio processing device of claim 1, wherein the computing device provides a virtual reality service to a user, and the position information corresponds to a movement of the user in a virtual domain of the virtual reality service.

7. The audio processing device of claim 5, wherein the position information is measured by a head mounted display worn by a user and forwarded by the computing device to the audio processing device after being measured by the head mounted display.

8. An audio processing method for controlling a plurality of speakers, comprising:

requesting, by an audio processing device, each of the speakers to output an audio positioning signal;

collecting, by an audio processing device, the audio positioning signal from each of the speakers;

retrieving, by an audio processing device, a location of each of the speakers relative to the audio processing device according to the audio positioning signal from each of the speakers;

adjusting, by an audio processing device, a plurality of audio contents based on the location of each of the speakers relative to the audio processing device, wherein position information is further received from a computing device, the position information is generated by the computing device based on a movement of a user in a virtual domain of a virtual reality service, and the step of adjusting, by the audio processing device, the plurality of audio contents based on the location of each of the speakers relative to the audio processing device comprises: processing the audio contents based on a plurality of space transfer functions and the position information, wherein the space transfer functions are defined based on the location of each of the speakers relative to the audio processing device; allocating the audio contents to the speakers; and sending, by an audio processing device, the audio contents to the speakers to control the speakers outputting the audio contents.

9. The method of claim 8, comprising:

requesting a first speaker of the speakers to output the audio positioning signal with a predetermined power;

receiving, by a microphone array of the audio processing device, the audio positioning signal from the first speaker;

adjusting, by the audio processing device, a receiving polar pattern of the microphone array to find a specific direction where a received power of the audio positioning signal is maximized;

determining, by the audio processing device, a specific distance between the audio processing device and the first speaker based on the predetermined power and the received power; and determining, by the audio processing device, the location of the first speaker relative to the audio processing device to be away from the audio processing device by the specific distance on the specific direction.

10. The method of claim 8, wherein a first audio content of the audio contents is allocated to a first speaker of the speakers, and the step of sending the audio contents to the speakers to control the speakers outputting the audio contents comprises:

sending the first audio content to the first speaker and control the first speaker to output the first audio content.

11. The method of claim 8, further comprising:

receiving, by the audio processing device, updated position information from the computing device;

processing the audio contents based on the space transfer functions and the updated position information; and allocating the audio contents to the speakers.

12. A computer program product for use in conjunction with an audio processing device, the computer program product comprising a computer readable storage medium and an executable computer program mechanism embedded therein, the executable computer program mechanism comprising instructions for:

requesting each of a plurality of speakers paired with the audio processing device to output an audio positioning signal;

collecting the audio positioning signal from each of the speakers;

retrieving a location of each of the speakers relative to the audio processing device according to the audio positioning signal from each of the speakers;

adjusting a plurality of audio contents based on the location of each of the speakers relative to the audio processing device, wherein position information is further received from a computing device, the position information is generated by the computing device based on a movement of a user in a virtual domain of a virtual reality service, and the step of adjusting, by the audio processing device, the plurality of audio contents based on the location of each of the speakers relative to the audio processing device comprises: processing the audio contents based on a plurality of space transfer functions and the position information, wherein the space transfer functions are defined based on the location of each of the speakers relative to the audio processing device; allocating the audio contents to the speakers; and sending the audio contents to the speakers to control the speakers outputting the audio contents.

* * * * *